(12) United States Patent
Johnson et al.

(10) Patent No.: US 6,997,350 B2
(45) Date of Patent: Feb. 14, 2006

(54) APPARATUS FOR ADDING FERTILIZER TO WATER IN AN UNDERGROUND SPRINKLING SYSTEM AND FERTILIZER THEREFOR

(75) Inventors: Dwight N. Johnson, Carlsbad, CA (US); Glen Grizzle, Murrieta, CA (US); Kary Burns, Draper, UT (US); James Marsden, South Jordan, UT (US); David Morton, Sandy, UT (US)

(73) Assignee: Fertile Earth Systems, Inc., South Jordan, UT (US)

( * ) Notice: Subject to any disclaimer, the term of this patent is extended or adjusted under 35 U.S.C. 154(b) by 0 days.

(21) Appl. No.: 10/842,733

(22) Filed: Apr. 30, 2004

(65) Prior Publication Data

US 2005/0121463 A1    Jun. 9, 2005

Related U.S. Application Data

(60) Provisional application No. 60/467,120, filed on Apr. 30, 2003.

(51) Int. Cl.
*B65D 5/08* (2006.01)

(52) U.S. Cl. .................. 222/57; 222/144.5; 222/145.6; 239/310; 137/99; 137/564.5

(58) Field of Classification Search ........... 222/57, 222/129, 144.5, 145.6; 239/310; 137/98, 137/99, 564.5
See application file for complete search history.

(56) References Cited

U.S. PATENT DOCUMENTS

| | | | | |
|---|---|---|---|---|
| 1,720,326 | A | * | 7/1929 | Halstead et al. ............... 137/99 |
| 3,549,048 | A | * | 12/1970 | Goodman ..................... 222/57 |
| 3,642,171 | A | * | 2/1972 | Ernst ............................. 222/57 |
| 4,370,996 | A | * | 2/1983 | Williams ...................... 222/57 |
| 4,432,105 | A | * | 2/1984 | Pitroda ....................... 239/303 |
| 4,651,765 | A | * | 3/1987 | Beth ............................ 137/99 |
| 5,366,159 | A | * | 11/1994 | Childers .................. 137/564.5 |
| 6,533,557 | B1 | | 3/2003 | Williams |

* cited by examiner

Primary Examiner—Eric Keasel
(74) Attorney, Agent, or Firm—Thorpe North & Western, LLP; Robert R. Mallinckrodt

(57) ABSTRACT

Apparatus for adding liquid fertilizer to a water line of a sprinkler system includes a mechanical injector device powered by a paddle wheel turned by water flowing through the water line. The mechanical injector device includes a plunger that moves back and forth in the plunger chamber. Movement in one direction allows liquid fertilizer from a liquid fertilizer reservoir to flow into the plunger chamber and movement of the plunger in the opposite direction injects the liquid fertilizer from the plunger chamber into the water. The mechanical injector device is coupled to the paddle wheel which causes movement of the plunger in the plunger chamber in at least one direction. Spring bias can cause movement of the plunger in the other direction. The mechanical injector device can be disabled to stop fertilizer injection while still allowing rotation of the paddle wheel. The paddle wheel is coupled to the mechanical injector device through a plunger gear which rotates, and interacting camming surfaces which project from the plunger gear and from a ratchet. A preferred fertilizer for use in the apparatus includes a bio-stimulant.

30 Claims, 8 Drawing Sheets

Figure 1:
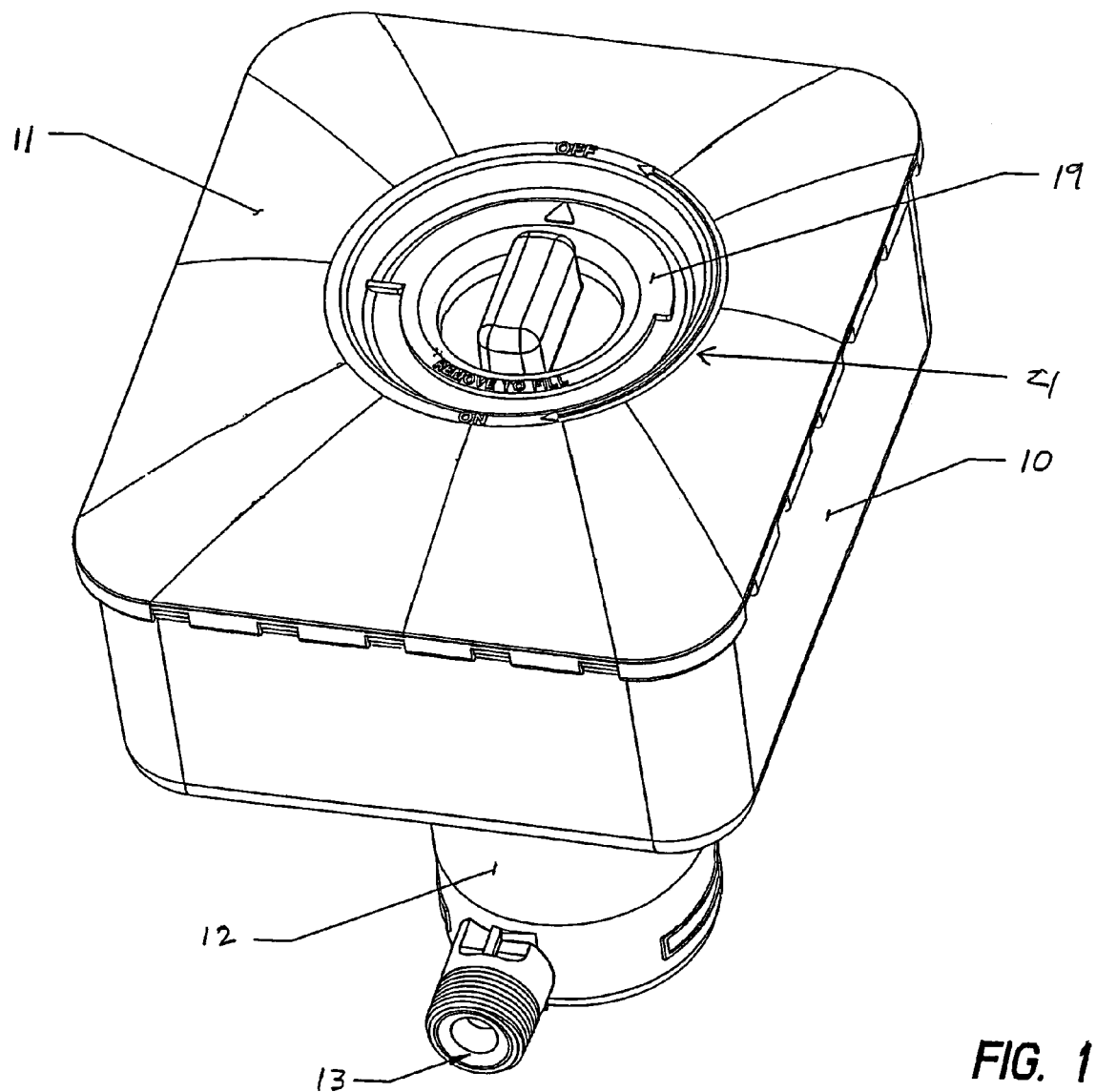

APPARATUS FOR ADDING FERTILIZER TO WATER IN AN UNDERGROUND SPRINKLING SYSTEM AND FERTILIZER THEREFOR

RELATED APPLICATION

This application claims the benefit of Provisional Application Ser. No. 60/467,120, filed Apr. 30, 2003, entitled "In-Line Liquid Fertilizer Injector."

BACKGROUND OF THE INVENTION

1. Field

The invention is in the field of apparatus for adding fertilizer to sprinkler systems.

2. State of the Art

Traditionally, fertilizer has been dispensed for home lawn and gardens by manually spraying the nutrients with a hose end or tank sprayer or by distribution of granulated fertilizer through several types of spreaders. Larger turf areas are often fertilized by blending liquid fertilizer with irrigation water using elaborate fertilizer delivery systems including electronic or pneumatic injection heads, electronic flow and batch control meters, EC and pH meters and instrumentation, and computerized part-per-million injection systems. For residential use, small, non-electronic systems are available that can be mounted directly into sprinkling system water supply lines and are operated by water pressure and water flow acting on reciprocating piston or diaphragm mechanisms. However, such systems are dirt sensitive, unreliable, and expensive to manufacture. Systems are also available that include compartments holding solid fertilizer with water directed over the solid fertilizer to dissolve it into the water. These systems are also unreliable and generally inaccurate in the amount of fertilizer dispensed.

The need remains for a fertilizer injection system that is relatively inexpensive and accurate in the amount of fertilizer injected, and includes a drive system that is not dirt sensitive.

SUMMARY OF THE INVENTION

The apparatus of the invention injects liquid fertilizer into a sprinkler system in order to fertilize lawns and gardens. The apparatus mounts directly in the water line of the sprinkler system, usually an underground water line, and uses a paddle wheel rotated by the water flowing in the water line as it flows through the apparatus to drive a mechanical fertilizer injector device. During operation, water from the sprinkling system flows past the paddle wheel causing it to turn. A nozzle may be used to direct the flowing water against the paddle wheel. The paddle wheel turns a planetary gear set that is connected to an output pinion. The output pinion turns a plunger gear attached to a plunger in a plunger chamber. As the plunger turns, slanted tabs on the plunger turn against similar tabs on a ratchet to move or cam the plunger against a spring force. The moving plunger in the plunger chamber first allows liquid fertilizer to enter the chamber and then moves to force the fertilizer in the chamber to flow through the plunger and into the water flowing in the water line to the sprinklers. In a preferred embodiment of the injector apparatus, the plunger chamber is located below a liquid fertilizer reservoir and the rotation of the plunger gear causes interaction of the slanted tabs on camming surfaces on the plunger gear and the ratchet which causes the plunger to move downwardly in the plunger chamber, allowing gravity flow of fertilizer from the liquid fertilizer reservoir into the plunger chamber. Flow may be through a secondary reservoir between the liquid fertilizer reservoir and the entrance to the plunger chamber. A buoyant check valve ball that floats on the liquid fertilizer in the plunger chamber prevents reverse flow of liquid fertilizer back into the liquid fertilizer reservoir. During the downward movement of the plunger, the buoyant ball drops into the plunger chamber to allow the liquid fertilizer to flow down from the reservoir, filling the space between the ball and the plunger. As the plunger tabs reach the top of the ratchet tabs, the tabs fall off each other. The loss of contact between the two sets of tabs which brings the tabs to a period of noninteraction, allows the spring to force the plunger upwards. The fluid trapped between the plunger and buoyant ball is subjected to pressure by the upwardly moving plunger. The pressure forces a check pin in the plunger downward. The fertilizer flows down around the check pin and through a passage through the plunger to mix with the water flowing through the apparatus to the sprinklers.

The amount of fertilizer released into the water depends on the water flow rate and the fertilizer injection rate. The mix ratio can be controlled by adjusting the size of a nozzle that directs the flowing water against the paddle wheel. The apparatus can advantageously use a fertilizer which includes a combination of traditional chemical fertilizers along with a bio stimulant which promotes microbial action in the soil to increase the utilization of the chemical fertilizer by the vegetation to which the fertilizer is applied.

THE DRAWINGS

Figure 2:
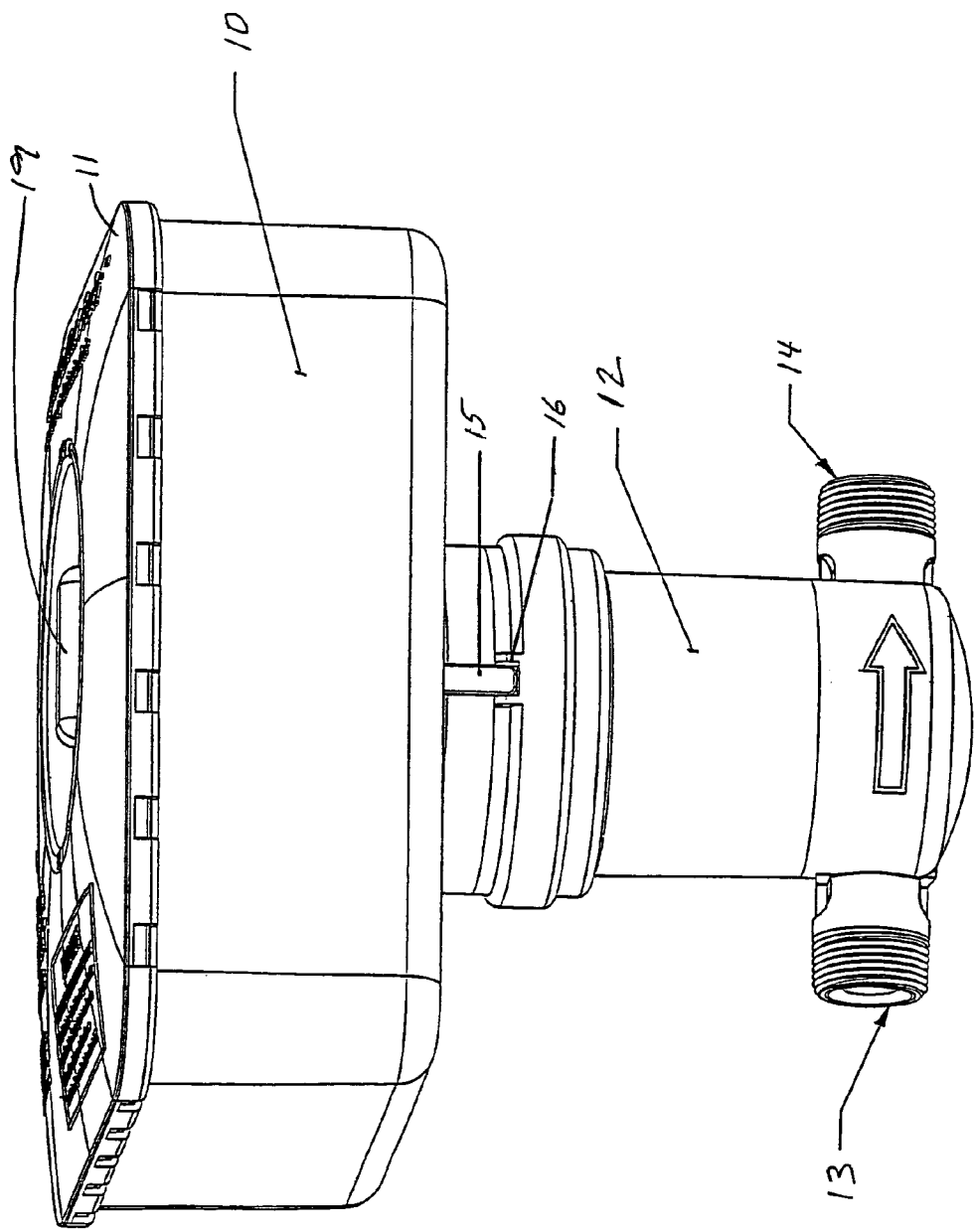
Figure 3:
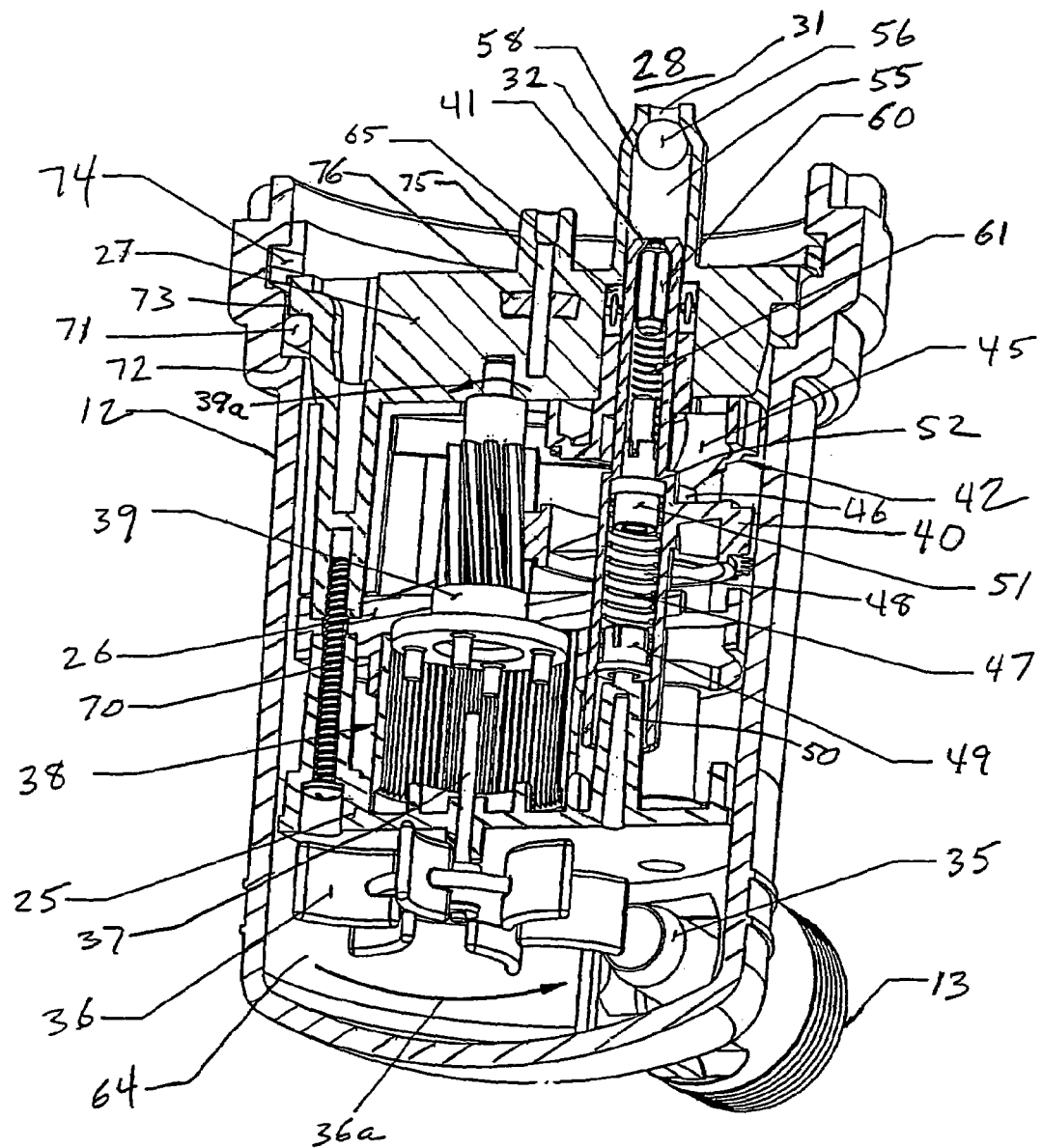
Figure 4:
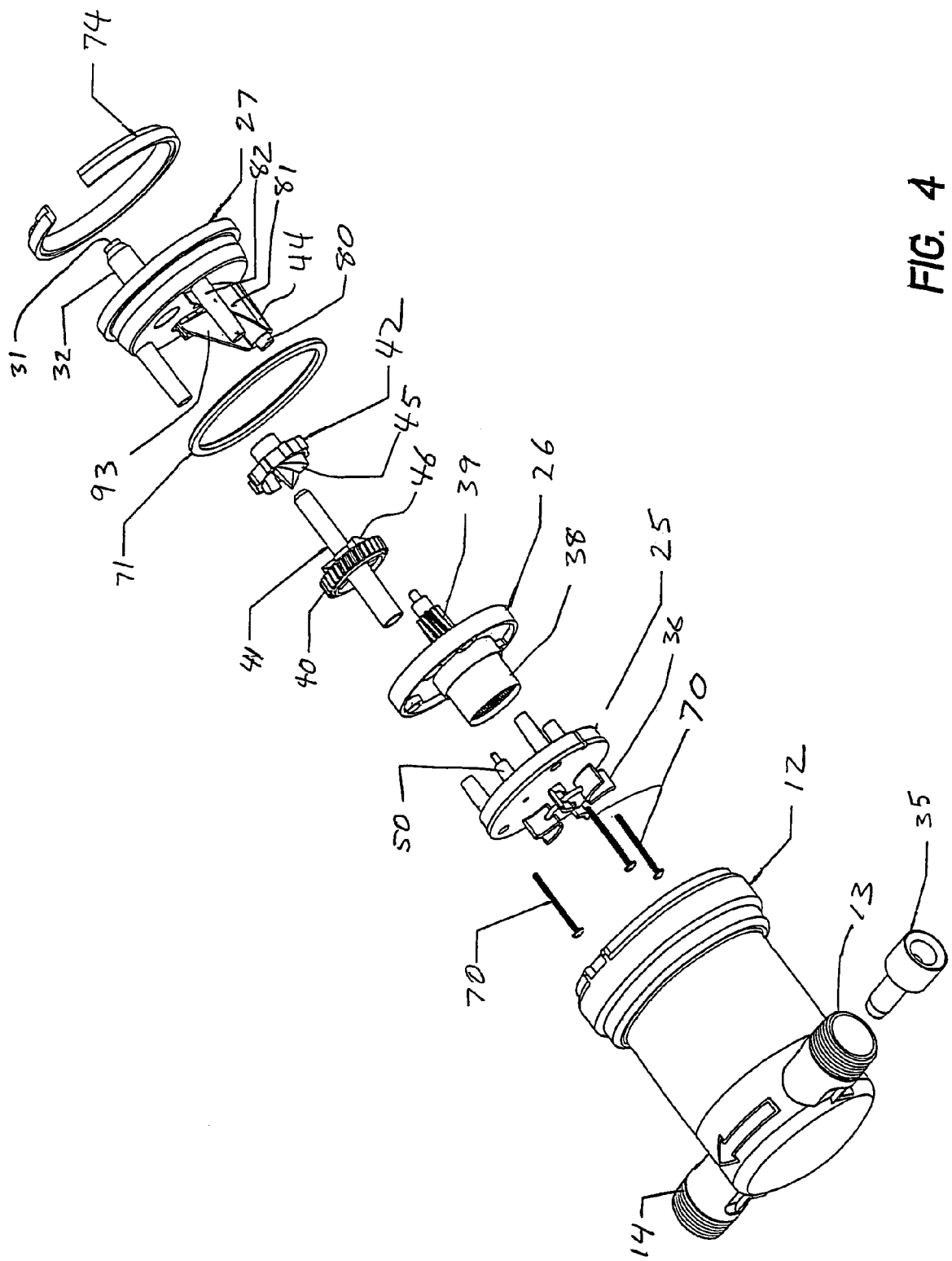
Figure 5:
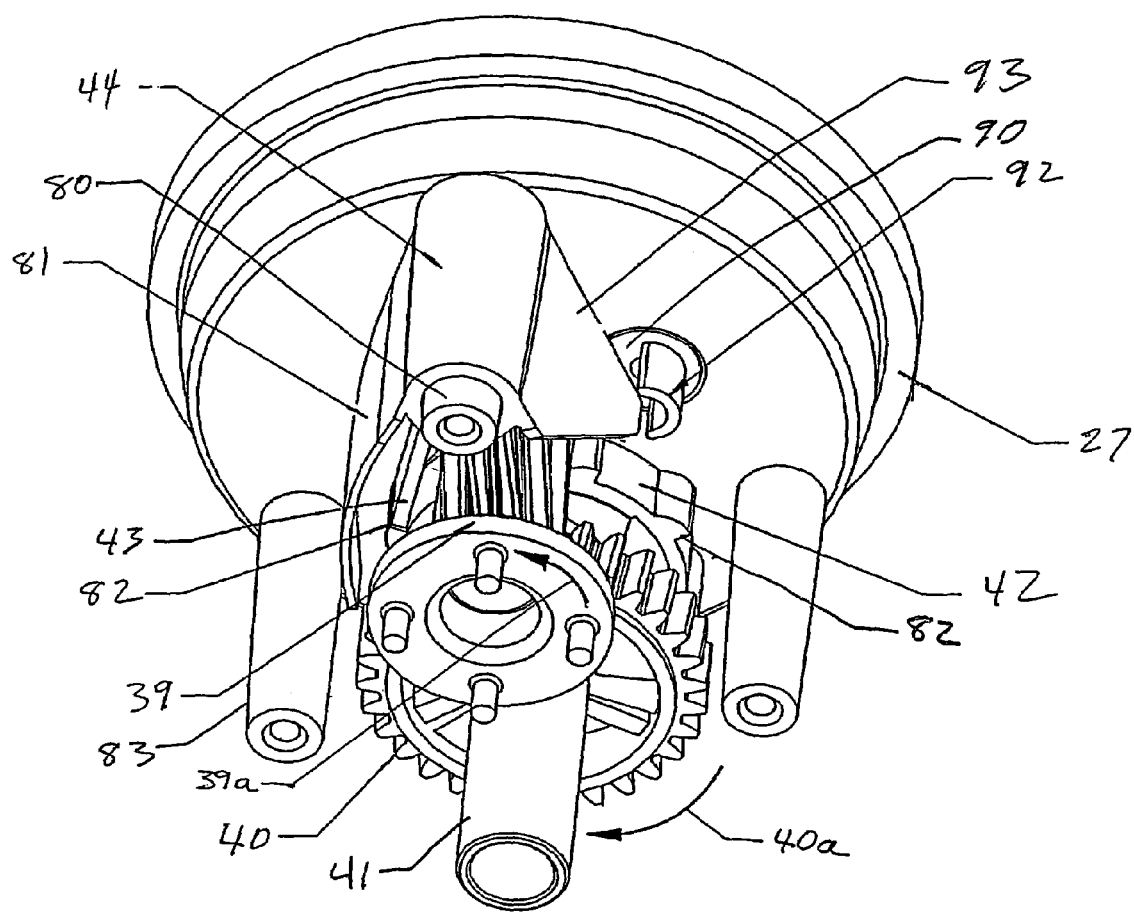
Figure 6:
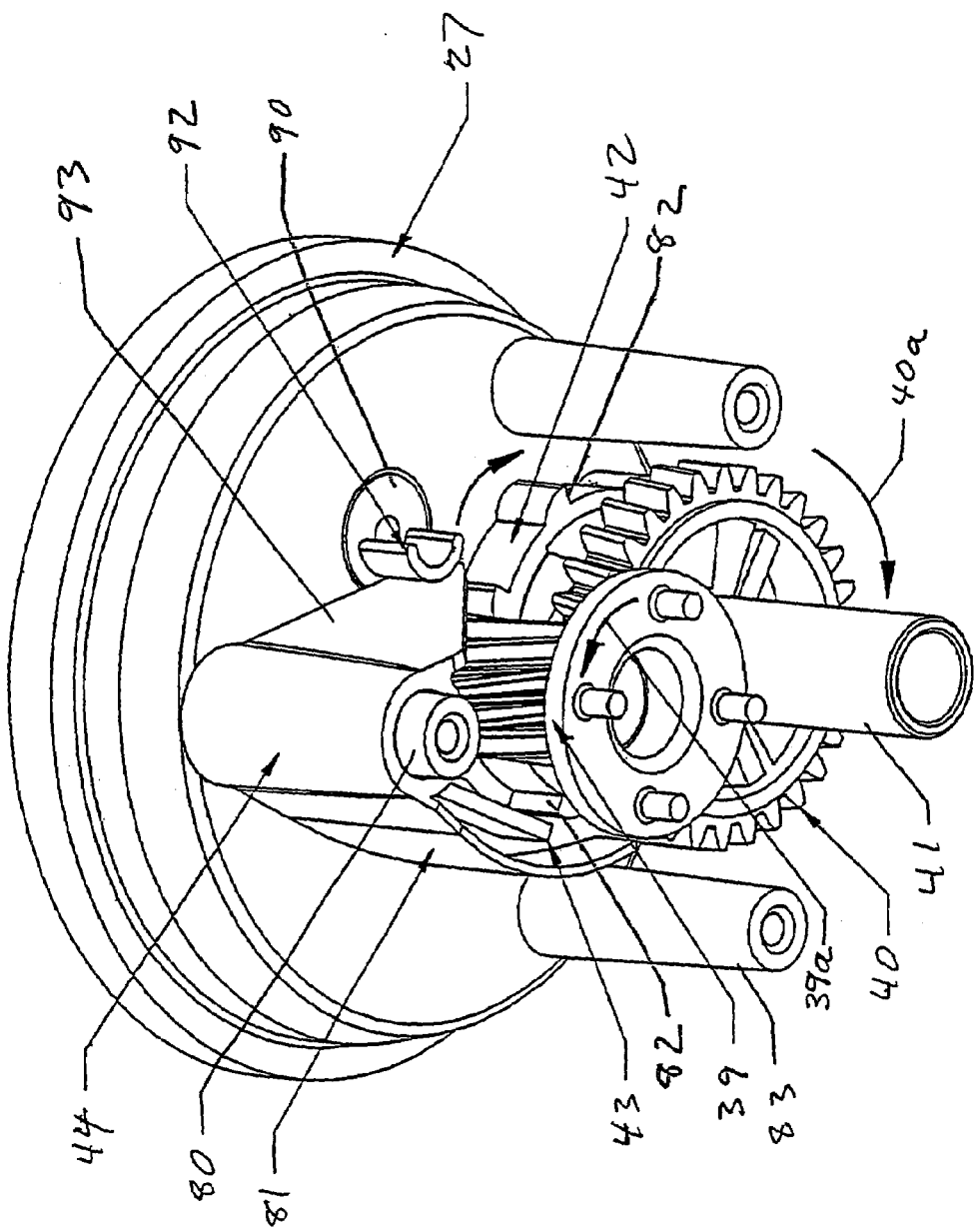
Figure 7:
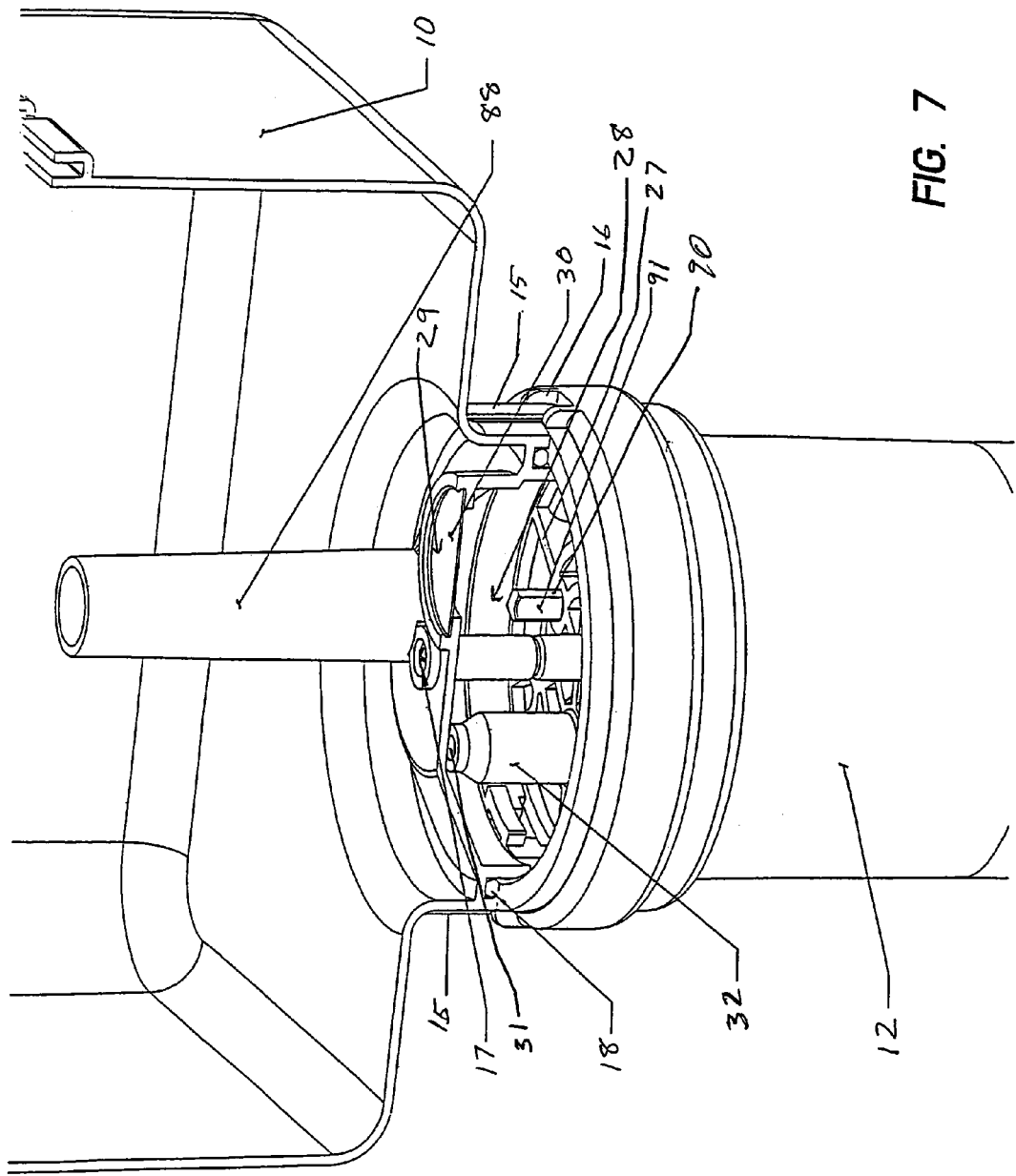
Figure 9:
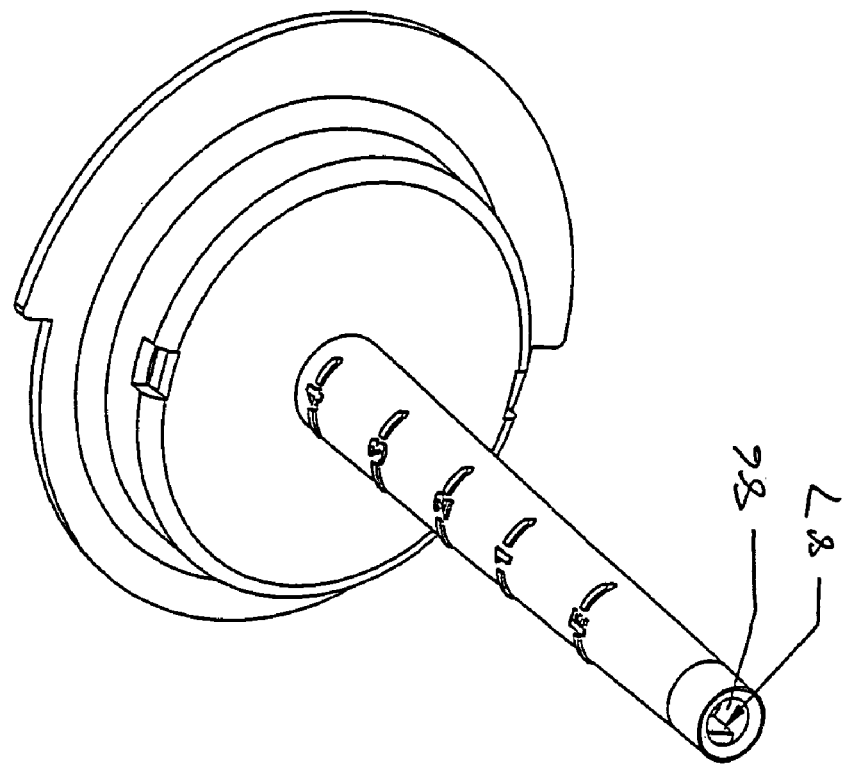
Figure 8:
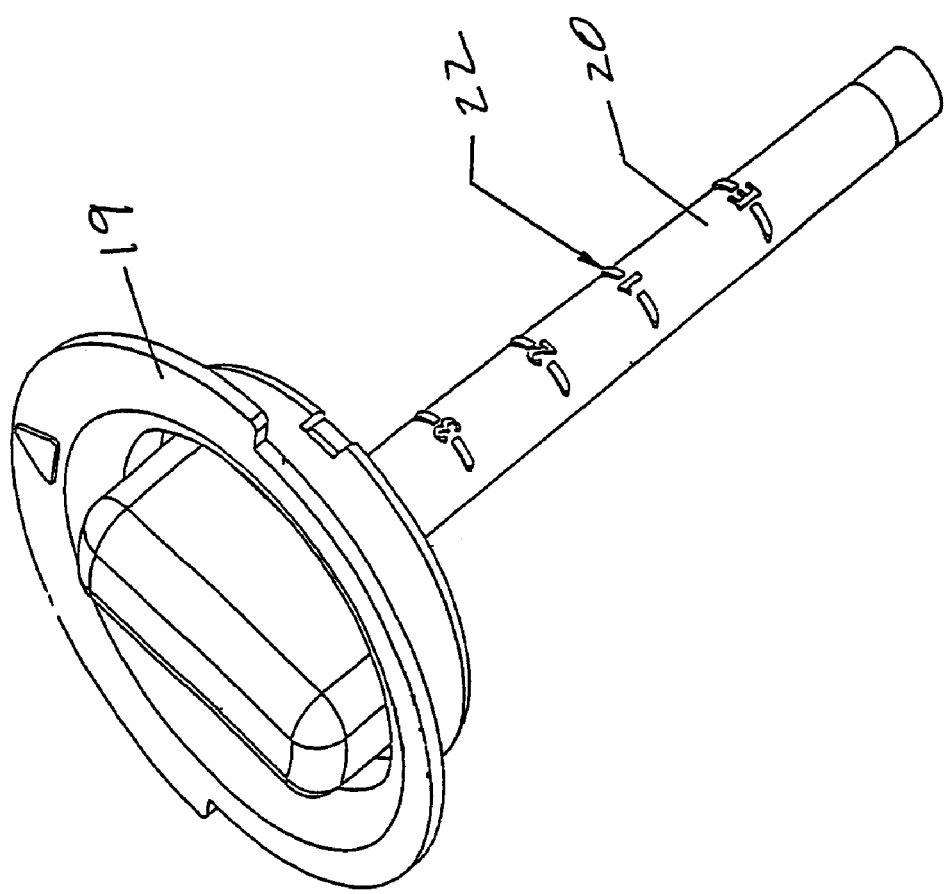

In the accompanying drawings, which show the best mode currently contemplated for carrying out the invention:

FIG. 1 is a perspective view of the liquid fertilizer injector apparatus of the invention;

FIG. 2, a side view of the apparatus of FIG. 1;

FIG. 3, a vertical section through the injector mechanism of the apparatus of FIG. 1;

FIG. 4, an exploded view of the injector mechanism of FIG. 3, showing how the parts are assembled;

FIG. 5, a bottom perspective view of a portion of the injector mechanism of FIG. 3, where a switch cam is engaged in the "on" position;

FIG. 6, a view similar to that of FIG. 5, but with the switch cam in the "off" position;

FIG. 7, a cutaway view of the fertilizer reservoir to show the top portion of the injection mechanism and showing the connection of the reservoir to the top of the injector body;

FIG. 8, a perspective view of the selector knob and stem of the apparatus of FIG. 1 removed from the reservoir; and FIG. 9, a perspective view of the selector knob and stem of the apparatus taken from a different angle than that in FIG. 8.

DETAILED DESCRIPTION OF THE INVENTION

The fertilizer injector apparatus of the invention includes a liquid fertilizer reservoir 10, FIGS. 1 and 2, where liquid fertilizer is stored, a lid 11 for the reservoir, an injector mechanism body 12, and a water inlet 13 and water outlet 14 that connect in a sprinkling system water pipe or line, not shown, so that water flowing through the sprinkler system water line to the sprinklers in the sprinkler system flows through a portion of the injector mechanism body of the apparatus. Liquid fertilizer reservoir 10 fits onto the top of injector mechanism body 12 and includes two tabs 15, FIG. 2, which engage slots 16 on the injector mechanism body 12 to maintain rotational alignment of the reservoir. Only one tab and slot is shown in FIG. 2 because the second tab and slot is on the opposite side of injector mechanism body 14, see FIG. 7. It is preferred that each of the two tabs and their receiving slots be of different widths so the reservoir 10 can fit onto injector mechanism body 12 in only one orientation to prevent the reservoir from being installed backwardly on the injector mechanism body. A single screw 17, FIG. 7, may be used to hold the reservoir 10 to the injector mechanism body 12. Leakage from the joint between reservoir 10 and injector mechanism body 12 is prevented by an O ring 18. If necessary, additional screws could be used to secure the reservoir to the injector mechanism body. An "on" "off" knob 19, FIGS. 1, 2, 8, and 9, includes a stem 20, FIGS. 8 and 9, and removably fits into and seals reservoir top opening 21, FIG. 1. Knob 19 may be removed to allow filling of reservoir 10 with liquid fertilizer through opening 21. Gradations 22, FIGS. 8 and 9, on stem 20 may be provided to indicate the amount of liquid fertilizer remaining in reservoir 10.

The injector mechanism body 12 holds and positions a lower plate 25, an intermediate plate 26, and a bulkhead 27, FIGS. 3 and 4, which mount the operating parts of the injector mechanism. A secondary reservoir 28, FIGS. 3 and 7, is formed between the bottom of reservoir 10 and the top of bulkhead 27 over injector mechanism body 12. Liquid fertilizer flows through reservoir bottom opening 29, FIG. 7, into secondary reservoir 28. Bottom opening 29 preferably includes a strainer screen 30 which filters out any large debris in the liquid fertilizer. Liquid fertilizer enters a mechanical injection device of the injector mechanism through an inlet 31, FIGS. 3, 4, and 7, in the top of a plunger chamber 32. Reservoir bottom opening 29 is preferably offset from plunger chamber inlet 31 as shown in FIG. 7. This offset location increases the likelihood that any fine debris that passes through screen 30 will settle into the top area of the bulkhead at a level below the height of the injector plunger chamber inlet 31 and thus not pass through inlet 31 to the plunger chamber.

The mechanical injector device is powered by water flowing through the sprinkler water flow line into water inlet 13 in the bottom portion of injector mechanism body 12, through a nozzle 35, FIGS. 3 and 4, and across a paddle wheel 36. The flowing water causes rotation of paddle wheel 36, here shown to be in a clockwise direction looking downwardly as shown by arrow 36*a*, which, in turn, causes liquid fertilizer from reservoir 10 which flows through secondary reservoir 28 and into plunger chamber inlet 31 to be injected into the water from the sprinkler system water flow line flowing through the apparatus. The amount of fertilizer injected is proportional to the speed of rotation of the paddle wheel which depends upon the flow rate of the water through the apparatus. Different nozzle sizes can be used to alter the water velocity acting against the paddle wheel at a given flow rate which changes the rotation rate of the paddle wheel.

The rotating paddle wheel 36, through shaft 37, FIG. 3, rotatably held in lower plate 25, turns a planetary gear set 38, held by lower plate 25 and intermediate plate 26, which, in turn, spins an output pinion 39. Output pinion 39 extends between and is rotatably held in position by intermediate plate 26 and bulkhead 27. The planetary gear set 38 is used to reduce the revolution rate of the connected output pinion 39 in relation to the revolution rate of paddle wheel 36 making the output pinion rotate more slowly than the paddle wheel 36. The revolving output pinion 39 turns plunger gear 40 which is part of, and concentric with, plunger 41. Thus, rotation of plunger gear 40 causes rotation of plunger 41. The gears are arranged so that clockwise rotation of paddle wheel 36 causes counterclockwise rotation of pinion gear 39, again looking downwardly, as indicated by arrow 39*a*, which causes clockwise rotation of plunger gear 40, indicated by arrow 40*a*, FIG. 5, and plunger 41.

As plunger gear 40 rotates, it rotates against a ratchet 42 that is held stationary against the clockwise rotation of plunger gear 40 by a pawl arm 43 of pawl 44, FIGS. 5 and 6. Ratchet 42 has slanted ratchet tabs 45, FIGS. 3 and 4, extending downwardly from the bottom thereof. The slanted ratchet tabs 45 act as ramps for similarly slanted plunger tabs 46 extending upwardly from plunger gear 40. The confronting camming surfaces of ratchet tabs 45 and the plunger tabs 46 push against one another as the plunger gear rotates in relation to the ratchet and force plunger 41 to move downwardly against the bias of a plunger spring 47 within plunger central bore 48. The lower end of plunger spring 47 is supported by a spring retainer 49 that rotates freely on a post 50 projecting from the lower plate 25. As plunger 41 rotates, plunger spring 47 and spring retainer 49 freely rotate with it. A spring guide 51 engages the top of plunger spring 47 and shoulder 52 in plunger central bore 48 to compress plunger spring 47 as plunger 41 moves downwardly.

Plunger 41 slides in plunger chamber 32 which connects through plunger chamber inlet 31 to liquid fertilizer secondary reservoir 28 so that liquid fertilizer held in secondary reservoir 28 flows into a space 55 between plunger chamber inlet 31 and the top of plunger 41. A buoyant check ball 56, made of a material, such as plastic, that floats in water and liquid fertilizer, is positioned in a narrowed, conical entrance 58 from secondary reservoir 28 to space 55 to form a check valve to prevent reverse flow of liquid fertilizer from plunger chamber space 55 back into secondary reservoir 28 and reservoir 10. As plunger 41 rotates and moves downwardly in plunger chamber 32, liquid fertilizer flows by gravity from secondary reservoir 28 past check ball 56 into the space 55. As liquid fertilizer fills space 55, check ball 56 floats and rises against narrow conical entrance 58. In the embodiment illustrated, it has been found that the liquid fertilizer reservoir 10 should be positioned above the injection mechanism housing so that the liquid fertilizer can flow by gravity into the plunger chamber.

As indicated, rotation of paddle wheel 36 causes rotation of plunger gear 40. This rotation causes interaction of plunger tabs 46 and ratchet tabs 45 to cause plunger 41 to move downwardly and allow liquid fertilizer to flow into space 55, which space enlarges as plunger 41 moves downwardly in plunger chamber 32. As the plunger tabs 46 reach the top of ratchet tabs 45, continuing rotation of plunger gear 40 causes the plunger tabs to fall off the ratchet tabs. The plunger spring 47 then forces plunger 41 upwardly in plunger chamber 32. Flow of liquid fertilizer from plunger chamber 32 back into secondary reservoir 28 is blocked by check ball 56. Therefore, the plunger 41 moving upwardly in plunger chamber 32 puts the liquid fertilizer trapped in space 55 under pressure. A check pin 60 in the end of plunger 41 is held in normally closed position closing the upper end of plunger central bore 48, which forms a flow passage for the liquid fertilizer through plunger 41, by check spring 61. The bottom of check spring 61 is supported in plunger central bore 48 by spring guide 51 while the top of check spring 61 rests against check pin 60. The plunger spring 47 is stronger than check spring 61 so overcomes the sealing force of check spring 61 on check pin 60 by exerting pressure to force plunger 41 upwardly. This pressurizes the liquid in space 55 to the extent that it moves check pin 60 against the bias of check spring 61 so that liquid fertilizer in space 55 flows around check pin 60 into plunger central bore 48, around post projection 50, and onto lower plate 25 from where it can flow around the circumference of lower plate 25. The liquid fertilizer then mixes with the water as the water passing the paddle wheel flows up into this area or as the fertilizer flows down around the circumference of lower plate 25 and into mixing chamber 64 where paddle wheel 36 is located. Check spring 61 has sufficient strength to provide necessary sealing force to check pin 60 to prevent the liquid fertilizer from being sucked downwardly from space 55 and secondary reservoir 28 into the mixing chamber 64 if the sprinkler water flow line is ever subject to a negative pressure. Plunger wipes 65 keep dirt from getting in the plunger chamber and form a seal for the bottom of plunger chamber 32 between the bottom of bulkhead 27 and the top of ratchet 42. As plunger gear 40 continues to rotate, there is a period of noninteraction between the tab camming surfaces until the tabs again meet and interact to again move the plunger gear and plunger downward.

The described plunger and plunger chamber arrangement forms a mechanical injector device which, in the manner described, injects the liquid fertilizer from reservoir 10 into the water from the sprinkler line flowing through the mixing chamber of the apparatus. The various gears, springs, and the interacting plunger and ratchet tabs form a drive so the rotation of the paddle wheel will operate the mechanical injector device.

The injection mechanism is assembled by placing the various parts between the lower plate 25, intermediate plate 26, and bulkhead 27, and securing the plates and bulkhead together by screws 70 extending through the lower and intermediate plates and threaded into the bulkhead. This assembly is then secured in the injector mechanism body with o-ring 71 between injector mechanism body shoulder 72 and bulkhead shoulder 73 to form a seal, by snap ring 74. Reservoir 10 is then positioned on injector mechanism body 12 and secured in place by screw 17 which is threaded into hole 75 in bulkhead 27. A brass nut or other insert 76 may be molded into bulkhead 27 aligned with hole 75 to ensure that screw 17 holding reservoir 10 in place can be adequately tightened without stripping hole 75 in the bulkhead, which is usually formed of plastic.

The ratchet and pawl is provided as a convenient way to turn the apparatus "on" and "off" and to prevent damage to the gearing and plunger lift mechanism such as ratchet tabs 45 and plunger tabs 46 in the event that the apparatus is connected backwardly and reverse flow is applied to the paddle wheel. In the instance of reverse flow which causes reverse rotation of the paddle wheel 36 and plunger 41, the ratchet 42 will merely spin with the rotating plunger. There is no interaction between the camming surfaces of the tabs. The plunger will not move down and up as described. Pawl 44 is pivotally mounted on post 80 extending from bulkhead 27. Pawl 44 includes a leaf spring member 81 made of a plastic material having spring like properties allowing leaf spring member 81, acting against post 83, to provide a preload force or bias to pawl 44 and pawl arm 43. With reverse rotation of ratchet 44, ratchet teeth 82 merely slide under pawl arm 43 as pawl arm 43 rotates against the bias created by spring member 81. However, with the proper direction of rotation of ratchet 44, pawl arm 43 engages a ratchet tooth 82 as shown in FIG. 5 to hold ratchet 44 from rotating.

It is preferred to be able to turn the apparatus of the invention "on" to inject fertilizer into the sprinkler line and to turn the apparatus "off" where water can flow through the apparatus to the sprinklers without injection of fertilizer. For this purpose, selector knob 19 includes stem 20, FIG. 9, having a bottom opening 86 with flat 87. When in place in reservoir opening 21, knob stem 20 fits through guide port 88, FIG. 7, extending from the reservoir bottom and the end of knob stem 20 fits over switch post 90. Switch post flat 91 mates with knob stem flat 87 so that rotation of knob 19 causes rotation of switch post 90. Switch post 90 extends through bulkhead 27 and includes a switch cam 92, FIGS. 5 and 6, which interacts with pawl switch arm 93 of pawl 44. With knob 19 rotated to "on" position, the switch post 90 and switch cam 92 are in the position shown in FIG. 5 and the apparatus operates to inject liquid fertilizer into the water flowing through the apparatus as described. With knob 19 rotated to "off" position, the switch post 90 and switch cam 92 is rotated to move pawl switch arm 93 to rotate pawl 44 to the position shown in FIG. 6 with pawl arm 43 of pawl 44 rotated away from engagement with ratchet teeth 82. In this position, ratchet 42 will rotate with plunger 41 in the forward direction and the ratchet tabs 45 and plunger tabs 46 will not interact to move over one another so there is no down and up or pumping movement of plunger 41. With no down and up movement of plunger 41, the mechanical injection device is disabled and no liquid fertilizer is injected into the sprinkler water passing through the apparatus. However, the paddle wheel continues to turn so that it does not disrupt the flow of water through the apparatus. If the paddle wheel was stopped, it would interfere with water flow.

A wide variety of gear ratios and plunger and nozzle dimensions may be used depending upon the amount of liquid fertilizer to be added to the water. An embodiment of the invention that has been found to work satisfactorily uses a planetary gear set 38 that reduces the revolution of the output pinion 39 at a ratio of 750:1 which means that the paddle wheel 36 must turn 750 times to turn the output pinion 39 one revolution. In that embodiment, the output pinion 39 has a ratio of 3:1 with the plunger gear 40. The ratchet 42 has three ratchet tabs 45 at a 120° spacing, resulting in the plunger 41 being forced downwardly against the plunger spring 47 three times for every revolution of the output pinion 39, or three times for every 750 turns of the paddle wheel 36. The valve seats in the top of injection chamber 58 and the top of plunger 41 are conical to facilitate the rapid purging of air from the injector to ensure that the required displacement volume of the plunger is achieved almost immediately after being installed. In an example, the described embodiment has an injector plunger 41 of 0.375 inches diameter and a downward movement of 0.500 inches yielding a displacement volume of 0.0552 cubic inches. This provides an injection of 0.02 ounces of fertilizer for each cycle or stroke of the plunger.

For a given flow rate in the sprinkler system line, the diameter of inlet nozzle 35 controls the injection rate of the liquid fertilizer. A smaller nozzle size will result in water hitting the paddle wheel 36 at a higher velocity. Higher velocity water will rotate the paddle wheel faster than slower water. The net result is that more liquid fertilizer is released at higher water velocities because the rotational speed of the paddle wheel controls the rate at which the plunger moves and therefore the rate at which liquid fertilizer is pumped or injected into the sprinkler system. The rotational speed of the paddle wheel is proportional to the rate of water flow through the inlet and nozzle. The paddle wheel rotation is caused by the kinetic energy from the inlet water, accelerated by the nozzle, acting against the blades of the paddle wheel, and the speed is retarded by viscous drag of the blades in the water field outside the nozzle plume. Both of these forces are described by second order functions and the result is a linear relationship between paddle wheel RPM and the rate of water flow passing through the nozzle. Further, the injector mechanism extracts power from the paddle wheel to inject the fertilizer into the water. The above factors may cause some slippage of the paddle wheel in the water to occur, particularly as the flow through the apparatus decreases. Good flow rates depend on the size of the nozzle. Nozzles of 0.65 inch diameter and 0.5 inch diameter have been found to have good water flow rates to provide a good proportional relationship from about 40 gallons/minute down to about 2 gallons/minute and at water pressures between about 10 psi to 125 psi. Different size nozzles may be provided to be selected by a user or installer depending upon the particular parameters and needs of the system with which the apparatus is to be used. With the apparatus as illustrated and described, a 0.65 inch diameter nozzle injects fertilizer at the rate of 1:8000, i.e., one part fertilizer to 8000 parts water. A 0.5 inch diameter nozzle, which gives a higher velocity stream directed to the paddle wheel for the same water volume flow rate, injects fertilizer at a rate of 1:6000.

The embodiment described uses spiral bevel gearing for the output pinion 39 and plunger gear 40 to cause an axial bias on the output pinion away from the planetary gear set as the gear train is loaded in order to prevent excessive friction on the planetary gear set due to thrust loading. Further, while most parts of the injector mechanism can be made of an acetal plastic material, it is preferred that the plunger, plunger gear, and the injector tabs and ratchet tabs be made of an acetal plastic material containing about 15% teflon and about 5% silicone to make such parts self-lubricating so that the confronting tab camming surface will more easily slide on one another and the plunger and plunger gear will more easily move up and down in relation to the plunger chamber and the pinion gear, respectively. The spring guide 51 and spring retainer 49 preferably have porting to allow rapid transfer of the liquid fertilizer out of the plunger bore when the plunger 41 is released and driven upwards by the plunger spring 47.

The injector mechanism body is preferably made of a GE Noryl GTX 830 plastic material with about 20% glass fiber added. This makes a very strong body that will withstand high internal water pressures.

As seen from the description of the illustrated embodiment, the illustrated embodiment of the invention includes a paddle wheel that, through a drive arrangement, moves a plunger to a cocked position in a plunger chamber while the chamber fills with liquid fertilizer. The plunger is released from its cocked position and moves under spring force in the plunger chamber to cause fertilizer in the chamber to flow through a passage in the plunger to the mixing chamber to mix with the water flowing through the mixing chamber to the sprinklers. The movement of the plunger in the plunger chamber injects the fertilizer in the plunger chamber into the water flowing through the apparatus.

The invention also includes a special fertilizer for use with the fertilizer injection apparatus. The fertilizer includes not only the normal macronutrients of nitrogen, phosphorus, and potassium as included in most fertilizers, but also includes bio-stimulants that cause microbial action in the soil to break down the components of the fertilizer applied into forms more usable by the vegetation treated and to breakdown and release other minerals in the soil. These other minerals are the micronutrients needed by the vegetation. The bio-stimulant is a mixture of enzymes, complexed carbohydrates, proteins, amino acids, and micronutrients, i.e., nutrients needed in small amounts by plants, such as boron, iron and zinc. A bio-stimulant triggers natural biological processes in the soil that convert tied up nutrients into a soluble form that plants can immediately utilize. The bio-stimulant also accelerates the break down and conversion of organic matter, such as crop residue, lawn clippings, etc., into humus, an extremely beneficial source of nutrients for plants. It does this by increasing the populations of indigenous microorganisms in the soil. A bio-stimulant suitable for use in the fertilizer of the invention is available under the name AGRI-GRO® from Agri-Gro Marketing, Inc. in Doniphan, Mo. The AGRI-GRO® product is derived from culturing and fermenting microbes such as azotobacter, bacillus and clostridium. The use of the bio-stimulant with the conventional fertilizer makes the conventional fertilizer go about twice as far and makes other micronutrients in the soil available for plant use. Further, the fertilizer of the invention has an acidic nature that helps keep the fertilizer from coagulating or crystalizing which could cause clogging of the passageways in the apparatus of the invention. Thus, use of such fertilizer with the apparatus of the invention helps to ensure that the apparatus works satisfactorily.

Preferred formulations of the fertilizer will contain between about 7% to about 18% nitrogen, about 2% to about 20% phosphorus, about 2% to about 13% potassium, and about 6% to about 25% bio-stimulant. The fertilizer is generally made by taking a conventional fertilizer that provides a nitrogen, phosphorus, and potassium analysis and mixing that with the bio-stimulant. Thus, a 10-13-13 conventional fertilizer (10% nitrogen, 13% phosphorus, and 13% potassium) may be mixed with bio-stimulant so that 15% of the final mixed fertilizer is bio-stimulant. In such case, the final concentrations in the mixed fertilizer will be 15% bio-stimulant, 8% nitrogen, 10% phosphorus, and 10% potassium. In a preferred form of fertilizer, the nitrogen is a urea nitrogen, the phosphorus is provided as phosphate or phosphoric acid, and the potassium is provided as potash, potassium hydroxide. Different formulations will be used for different uses, such as gardens or lawns, and for different times of year.

For example, an early season lawn and landscape fertilizer may use an 18-3-3 fertilizer with 18% bio-stimulant added, a midseason lawn and landscape fertilizer may use a 10-13-13-fertilizer with 15% bio-stimulant added, and a late season lawn and landscape fertilizer may use an 18-4-4 fertilizer with 6% bio-stimulant added. A garden fertilizer may use a 10-13-13 fertilizer with 25% bio-stimulant added while a bedding plant fertilizer may use a 10-20-10 fertilizer with 18% bio-stimulant added.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

What is claimed is:

1. Apparatus for injecting liquid fertilizer into a water flow line in a sprinkler system, comprising:
    an injector mechanism body having a water inlet and a water outlet adapted to be connected in the water flow line of the sprinkler system so that water flows through at least a mixing chamber in the body;

a liquid fertilizer reservoir;

a plunger chamber in one way flow communication with the liquid fertilizer reservoir to allow liquid fertilizer to flow from the reservoir to the plunger chamber, and in flow communication with the mixing chamber;

a plunger movably positioned in the plunger chamber;

a paddle wheel positioned to be rotated by water flowing through the injector mechanism body;

a plunger gear coupled to the paddle wheel and the plunger which rotates when the paddle wheel rotates; and interacting camming surfaces, one of the interacting camming surfaces extending from the plunger gear, the other of the interacting camming surfaces being stationary during normal operation of the apparatus, whereby interaction of the camming surfaces as the plunger gear rotates causes movement of the plunger in the plunger chamber in at least one of two directions, movement of the plunger in one direction in the plunger chamber allowing flow of liquid fertilizer from the liquid fertilizer reservoir into the plunger chamber and movement of the plunger in the other direction in the plunger chamber causing flow of liquid fertilizer from the plunger chamber to the mixing chamber.

2. Apparatus for injecting liquid fertilizer into a sprinkler line according to claim 1, wherein the other of the interacting camming surfaces extends from a ratchet which holds the other of the interactive camming surfaces stationary during normal operation of the apparatus.

3. Apparatus for injecting liquid fertilizer into a sprinkler line according to claim 2, wherein the plunger gear has a normal direction of rotation, and wherein the ratchet holds the camming surface stationary during rotation of the plunger gear in the normal direction of rotation, but rotates with the plunger gear if the plunger gear rotates in an abnormal direction of rotation to prevent interaction of the camming surfaces.

4. Apparatus for injecting liquid fertilizer into a sprinkler line according to claim 2, additionally including a bias spring to bias the plunger to a bias direction of movement in the plunger chamber, and wherein the camming surfaces cause movement of the plunger in the plunger chamber in a direction opposite the bias direction against the bias of the bias spring, and the bias spring causes movement of the plunger in the plunger chamber in the bias direction when allowed by the camming surfaces.

5. Apparatus for injecting liquid fertilizer into a sprinkler line according to claim 4, wherein the camming surfaces allow the plunger to move in the bias direction during periods of noninteraction of the camming surfaces immediately after periods of interaction of the camming surfaces.

6. Apparatus for injecting liquid fertilizer into a sprinkler line according to claim 2, wherein the coupling between the paddle wheel and the plunger gear includes a planetary gear set driven by the paddle wheel, and a pinion gear driven by the planetary gear set which drives the plunger gear, rotation of the plunger gear being at a rate less than rotation of the paddle wheel.

7. Apparatus for injecting liquid fertilizer into a sprinkler line according to claim 2, wherein the plunger rotates with the plunger gear.

8. Apparatus for injecting liquid fertilizer into a sprinkler line according to claim 7, wherein the ratchet is allowed to rotate with the plunger gear to place the apparatus in an "off" condition.

9. Apparatus for injecting liquid fertilizer into a sprinkler line according to claim 2, wherein the ratchet is allowed to rotate with the plunger gear to place the apparatus in an "off" condition.

10. Apparatus for injecting liquid fertilizer into a sprinkler line according to claim 1, additionally including a bias spring to bias the plunger to a bias direction of movement in the plunger chamber, and wherein the camming surfaces cause movement of the plunger in the plunger chamber in a direction opposite the bias direction against the bias of the bias spring, and the bias spring causes movement of the plunger in the plunger chamber in the bias direction when allowed by the camming surfaces.

11. Apparatus for injecting liquid fertilizer into a sprinkler line according to claim 10, wherein the camming surfaces allow the plunger to move in the bias direction during periods of noninteraction of the camming surfaces immediately after periods of interaction of the camming surfaces.

12. Apparatus for injecting liquid fertilizer into a sprinkler line according to claim 1, wherein flow of liquid fertilizer from the plunger chamber to the mixing chamber is through a flow passage in the plunger.

13. Apparatus for injecting liquid fertilizer into a sprinkler line according to claim 1, additionally including a valve to prevent flow of liquid fertilizer from the plunger chamber into the mixing chamber in the event of a partial vacuum in the mixing chamber.

14. Apparatus for injecting liquid fertilizer into a sprinkler line according to claim 13, wherein flow of liquid fertilizer from the plunger chamber to the mixing chamber is through a flow passage in the plunger, and wherein the valve to prevent flow of liquid fertilizer from the plunger chamber into the mixing chamber in the event of a partial vacuum in the mixing chamber is a valve in the plunger flow passage.

15. Apparatus for injecting liquid fertilizer into a sprinkler line according to claim 14, wherein the valve in the plunger flow passage is spring loaded with a valve spring exerting valve spring force closing the valve.

16. Apparatus for injecting liquid fertilizer into a sprinkler line according to claim 15, wherein movement of the plunger in the bias direction causes flow of liquid fertilizer from the plunger chamber to the mixing chamber, and wherein the force exerted by the bias spring in moving the plunger in the plunger chamber is greater than the valve spring force closing the valve, whereby liquid fertilizer flows through the valve into the mixing chamber during movement of the plunger in the bias direction.

17. Apparatus for injecting liquid fertilizer into a sprinkler line according to claim 1, wherein the paddle wheel is located in the mixing chamber.

18. Apparatus for injecting liquid fertilizer into a sprinkler line according to claim 17, wherein a nozzle is positioned in the apparatus to direct the flowing water against the paddle wheel in the mixing chamber.

19. Apparatus for injecting liquid fertilizer into a sprinkler line according to claim 1, wherein the one way flow communication between the plunger chamber and the liquid fertilizer reservoir is provided by a flow path through a one way check valve.

20. Apparatus for injecting liquid fertilizer into a sprinkler line according to claim 19, wherein the one way check valve includes a check ball in the plunger chamber which floats in liquid fertilizer in the plunger chamber and blocks flow of liquid fertilizer from the plunger chamber to the liquid fertilizer reservoir.

21. Apparatus for adding liquid fertilizer to a sprinkler line according to claim 1, in combination with a liquid fertilizer in the liquid fertilizer reservoir which is injected by the apparatus into the water flow line of the sprinkler system.

22. Apparatus for adding liquid fertilizer to a sprinkler line according to claim 21, wherein the liquid fertilizer comprises:

nitrogen containing material;

phosphorus containing material;

potassium containing material; and a bio-stimulant that increases microbial activity in the soil to which it is applied to convert minerals applied to the soil and in the soil to forms that are usable by vegetation growing in the soil.

23. Apparatus for adding liquid fertilizer to a sprinkler line according to claim 22, wherein the fertilizer includes between about 7% to about 18% nitrogen, about 2% to about 20% Phosphorus, about 2% to about 13% potassium, and about 6% to about 25% bio-stimulant.

24. Apparatus for injecting liquid fertilizer into a water flow line in a sprinkler system, comprising:

an injector mechanism body having a water inlet and a water outlet adapted to be connected in the water flow line of the sprinkler system so that water flows through at least a mixing chamber in the body;

a liquid fertilizer reservoir;

a mechanical injector device in flow communication with the liquid fertilizer reservoir and the mixing chamber to inject liquid fertilizer from the reservoir into the mixing chamber;

a paddle wheel positioned to be rotated by water flowing through the injector mechanism body and coupled to the mechanical injector device so that rotation of the paddle wheel causes mechanical operation of the mechanical injector device; and means to disable mechanical operation of the mechanical injector device when desired while still allowing rotation of the paddle wheel.

25. Apparatus for injecting liquid fertilizer into a sprinkler line according to claim 24, wherein the means to disable mechanical operation of the mechanical injector device includes a rotating element coupled to the paddle wheel to rotate when the paddle wheel rotates and a control element that is held stationary when desired to operate the mechanical injector device and is allowed to rotate with the rotating element to disable the mechanical injector device.

26. Apparatus for injecting liquid fertilizer into a sprinkler line according to claim 25, wherein the rotating element and the control element include interacting camming surfaces that interact to cause operation of the mechanical injector device when the control element is held stationary but do not interact when the control element rotates with the rotating element.

27. Apparatus for injecting liquid fertilizer into a sprinkler line according to claim 26, wherein the control element is a ratchet which is held stationary to cause operation the mechanical injector device and is allowed to rotate with the rotating element to disable mechanical operation of the mechanical injector device.

28. Apparatus for injecting liquid fertilizer into a sprinkler line according to claim 25, wherein the coupling between the paddle wheel and the rotating element includes a planetary gear set driven by the paddle wheel, rotation of the plunger gear being at a rate less than rotation of the paddle wheel.

29. Apparatus for adding liquid fertilizer to a sprinkler line according to claim 24, in combination with a liquid fertilizer in the liquid fertilizer reservoir which is injected by the apparatus into the water flow line of the sprinkler system.

30. Apparatus for adding liquid fertilizer to a sprinkler line according to claim 29, wherein the liquid fertilizer comprises:

nitrogen containing material;

phosphorus containing material;

potassium containing material; and a bio-stimulant that increases microbial activity in the soil to which it is applied to convert minerals applied to the soil and in the soil to forms that are usable by vegetation growing in the soil.

* * * * *